(12) United States Patent
Suciu et al.

(10) Patent No.: US 9,194,290 B2
(45) Date of Patent: Nov. 24, 2015

(54) COUNTER-ROTATING LOW PRESSURE TURBINE WITHOUT TURBINE EXHAUST CASE

(75) Inventors: Gabriel L. Suciu, Glastonbury, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 940 days.

(21) Appl. No.: 13/408,250

(22) Filed: Feb. 29, 2012

(65) Prior Publication Data
US 2013/0219860 A1 Aug. 29, 2013

(51) Int. Cl.
*F02C 3/107* (2006.01)
*F02K 3/072* (2006.01)
*F01D 25/30* (2006.01)
*F02K 1/78* (2006.01)

(52) U.S. Cl.
CPC ............... *F02C 3/107* (2013.01); *F01D 25/30* (2013.01); *F02K 1/78* (2013.01); *F02K 3/072* (2013.01); *F05D 2250/36* (2013.01); *Y02T 50/671* (2013.01)

(58) Field of Classification Search
CPC ............... F01D 5/03; F01D 1/24; F01D 1/26; F02C 3/107; F02C 3/067; F02K 1/78; F02K 3/072
USPC ................................................. 416/122, 128
See application file for complete search history.

(56) References Cited

U.S. PATENT DOCUMENTS

| | | | |
|---|---|---|---|
| 2,702,985 A | * | 3/1955 | Raymond ............ 60/226.1 |
| 4,817,382 A | | 4/1989 | Rudolph et al. |
| 4,947,642 A | | 8/1990 | Grieb et al. |
| 4,969,325 A | | 11/1990 | Adamson et al. |
| 5,010,729 A | | 4/1991 | Adamson et al. |
| 5,307,622 A | | 5/1994 | Ciokajlo et al. |
| 6,381,948 B1 | | 5/2002 | Klingels |
| 6,619,030 B1 | | 9/2003 | Seda et al. |
| 6,684,626 B1 | | 2/2004 | Orlando et al. |
| 6,763,652 B2 | | 7/2004 | Baughman et al. |
| 6,763,653 B2 | | 7/2004 | Orlando et al. |
| 6,763,654 B2 | | 7/2004 | Orlando et al. |
| 7,186,073 B2 | | 3/2007 | Orlando et al. |
| 7,451,592 B2 | | 11/2008 | Taylor et al. |
| 7,490,461 B2 | | 2/2009 | Moniz et al. |
| 7,493,754 B2 | | 2/2009 | Moniz et al. |
| 7,716,914 B2 | | 5/2010 | Schilling |

(Continued)

FOREIGN PATENT DOCUMENTS

DE 1003514 B * 11/1953 ............. F02C 3/067

OTHER PUBLICATIONS

DE 1003514 B English Translation. FLS, Inc. Mar. 2015. 7 pages.*

(Continued)

*Primary Examiner* — Richard Edgar
(74) *Attorney, Agent, or Firm* — Carlson, Gaskey & Olds, PC

(57) ABSTRACT

A gas turbine engine includes a shaft defining an axis of rotation. An inner rotor directly drives the shaft and includes an inner set of blades. An outer rotor has an outer set of blades interspersed with the inner set of blades. The outer rotor is configured to rotate in an opposite direction about the axis of rotation from the inner rotor. A gear system is engaged to the outer rotor and is positioned upstream of the inner set of blades.

22 Claims, 5 Drawing Sheets

(56) References Cited

U.S. PATENT DOCUMENTS

| | | |
|---|---|---|
| 7,726,113 B2 | 6/2010 | Orlando et al. |
| 7,841,165 B2 | 11/2010 | Orlando et al. |
| 7,926,259 B2 | 4/2011 | Orlando et al. |
| 7,950,220 B2 | 5/2011 | Merry et al. |
| 8,015,798 B2 | 9/2011 | Norris et al. |
| 2006/0093464 A1 | 5/2006 | Moniz et al. |
| 2009/0151317 A1* | 6/2009 | Norris et al. ............... 60/39.162 |
| 2009/0191045 A1* | 7/2009 | Suciu et al. .................... 415/68 |
| 2010/0154384 A1 | 6/2010 | Schilling |
| 2011/0206498 A1 | 8/2011 | McCooey |

OTHER PUBLICATIONS

International Preliminary Report on Patentability for Application No. PCT/US2013/025742, dated Sep. 12, 2014.

International Search Report and Written Opinion for International Application No. PCT/US2013/025742 completed on Nov. 11, 2013.

* cited by examiner

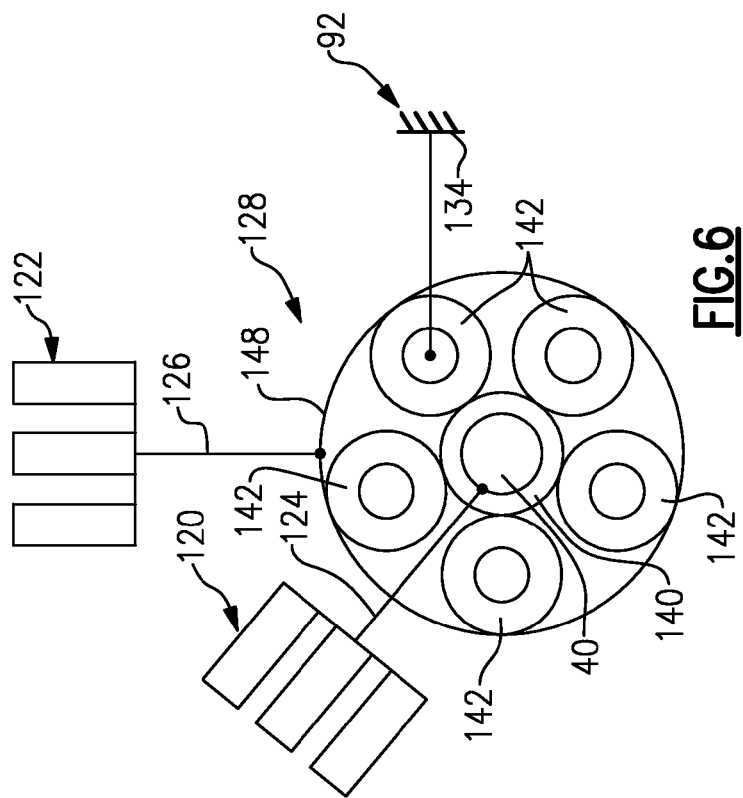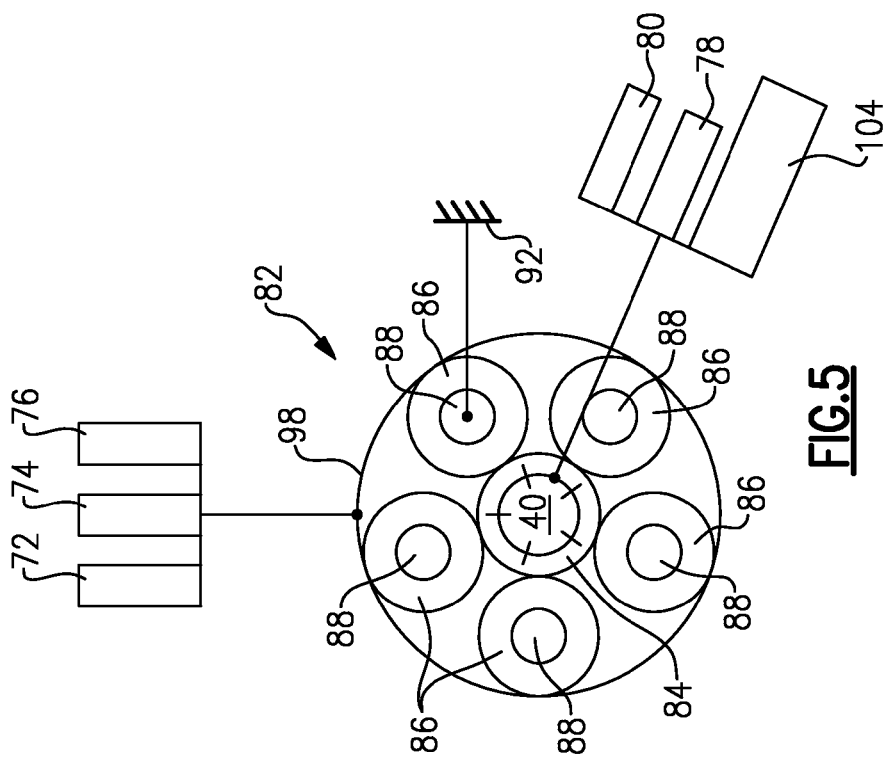

COUNTER-ROTATING LOW PRESSURE TURBINE WITHOUT TURBINE EXHAUST CASE

BACKGROUND

A typical jet engine has multiple shafts or spools that transmit torque between turbine and compressor sections of the engine. In one example, a low speed spool generally includes a low shaft that interconnects a fan, a low pressure compressor, and a low pressure turbine. In order to achieve a desirable high pressure core ratio, a long low shaft is required. In contrast, to increase an engine's power density, there is a countering goal of shortening the overall engine length. Thus, historically these two concepts have been at odds.

SUMMARY

In one exemplary embodiment, a gas turbine engine includes a shaft defining an axis of rotation, a turbine section, and gear system. The turbine section includes: (a) an inner rotor that directly drives the shaft and includes an inner set of blades; and (b) an outer rotor that has an outer set of blades interspersed with the inner set of blades. The outer rotor is configured to rotate in an opposite direction about the axis of rotation from the inner rotor. The gear system is engaged to the outer rotor and is positioned upstream of the inner set of blades.

In a further embodiment of the above, the gear system is mounted to a mid-turbine frame structure.

In a further embodiment of any of the above, the gear system includes a ring gear engaged to the outer rotor, a plurality of star gears in meshing engagement with the ring gear, and a sun gear in meshing engagement with the star gears.

In a further embodiment of any of the above, the sun gear is fixed for rotation with the shaft about the axis of rotation.

In a further embodiment of any of the above, the star gears are supported within a carrier that is mounted to the mid-turbine frame structure.

In a further embodiment of any of the above, a bearing supports the shaft for rotation relative to the carrier and mid-turbine frame structure.

In a further embodiment of any of the above, the bearing is positioned upstream of the inner and outer sets of blades.

In a further embodiment of any of the above, a first bearing supports a fore end of the outer rotor for rotation relative to the mid-turbine frame structure and a second bearing supports an aft end of the outer rotor for rotation relative to the shaft.

In a further embodiment of any of the above, a seal is located at an interface between the mid-turbine frame structure and the outer rotor.

In a further embodiment of any of the above, the outer rotor comprises an aftmost end of the engine.

In a further embodiment of any of the above, a fore end of the shaft is associated with a counter-rotating low pressure compressor.

In another exemplary embodiment, a gas turbine engine comprises a core air flowpath and a shaft supporting a compressor section and a turbine section arranged within the core flowpath. The turbine section includes a counter-rotating low pressure turbine comprising an inner rotor directly driving the shaft and having an inner set of blades and an outer rotor having an outer set of blades interspersed with the inner set of blades. The outer rotor is configured to rotate in an opposite direction about the axis of rotation from the inner rotor. A gear system is engaged to the outer rotor and is positioned upstream of the inner set of blades.

In a further embodiment of any of the above, the compressor section includes a high pressure compressor section that has a pressure ratio of approximately 23:1.

In a further embodiment of any of the above, the compressor section includes a counter-rotating low pressure compressor driven by the shaft.

In a further embodiment of any of the above, the gear system is mounted to a mid-turbine frame structure.

In a further embodiment of any of the above, the gear system includes a ring gear engaged to the outer rotor, a plurality of star gears in meshing engagement with the ring gear, a carrier mounted to the mid-turbine frame structure to support the star gears, and a sun gear in meshing engagement with the star gears.

In a further embodiment of any of the above, a first bearing supports a fore end of the outer rotor for rotation relative to the mid-turbine frame structure, a second bearing supports an aft end of the outer rotor for rotation relative to the shaft, and a third bearing supports the shaft for rotation relative to the carrier. The first and third bearings are upstream of the inner and outer sets of blades.

In a further embodiment of any of the above, the first and third bearings are generally radially aligned with each other.

In a further embodiment of any of the above, the first and third bearings are roller bearings and the second bearing is a ball bearing.

In a further embodiment of any of the above, a seal is located between the mid-turbine frame structure and the outer rotor.

BRIEF DESCRIPTION OF THE DRAWINGS

The disclosure can be further understood by reference to the following detailed description when considered in connection with the accompanying drawings wherein:

FIG. 5 shows a schematic view of the lower pressure compressor shown in FIG. 2.

FIG. 6 shows a schematic view of the lower pressure turbine shown in FIG. 2.

DETAILED DESCRIPTION

Figure 1:
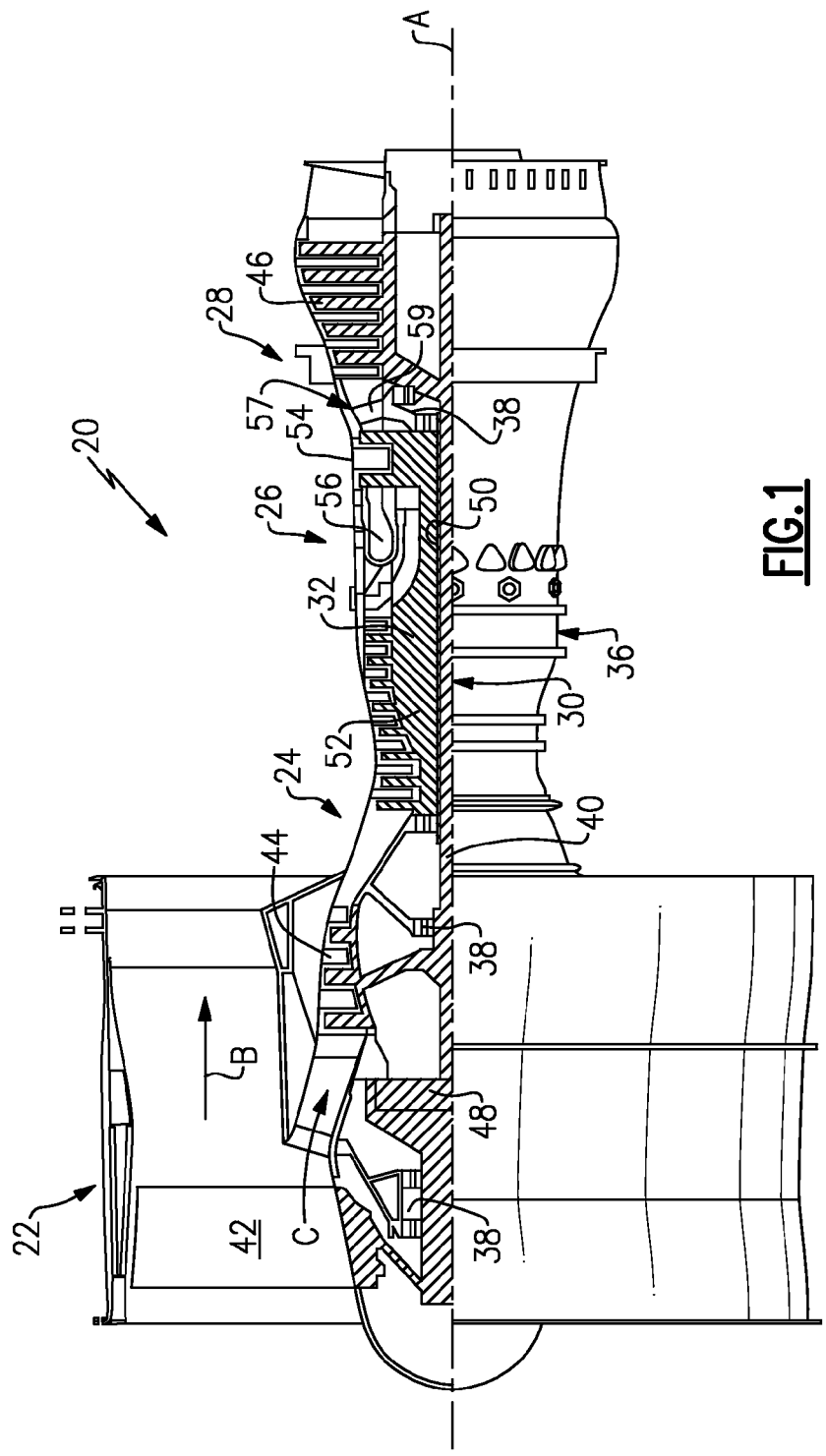
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
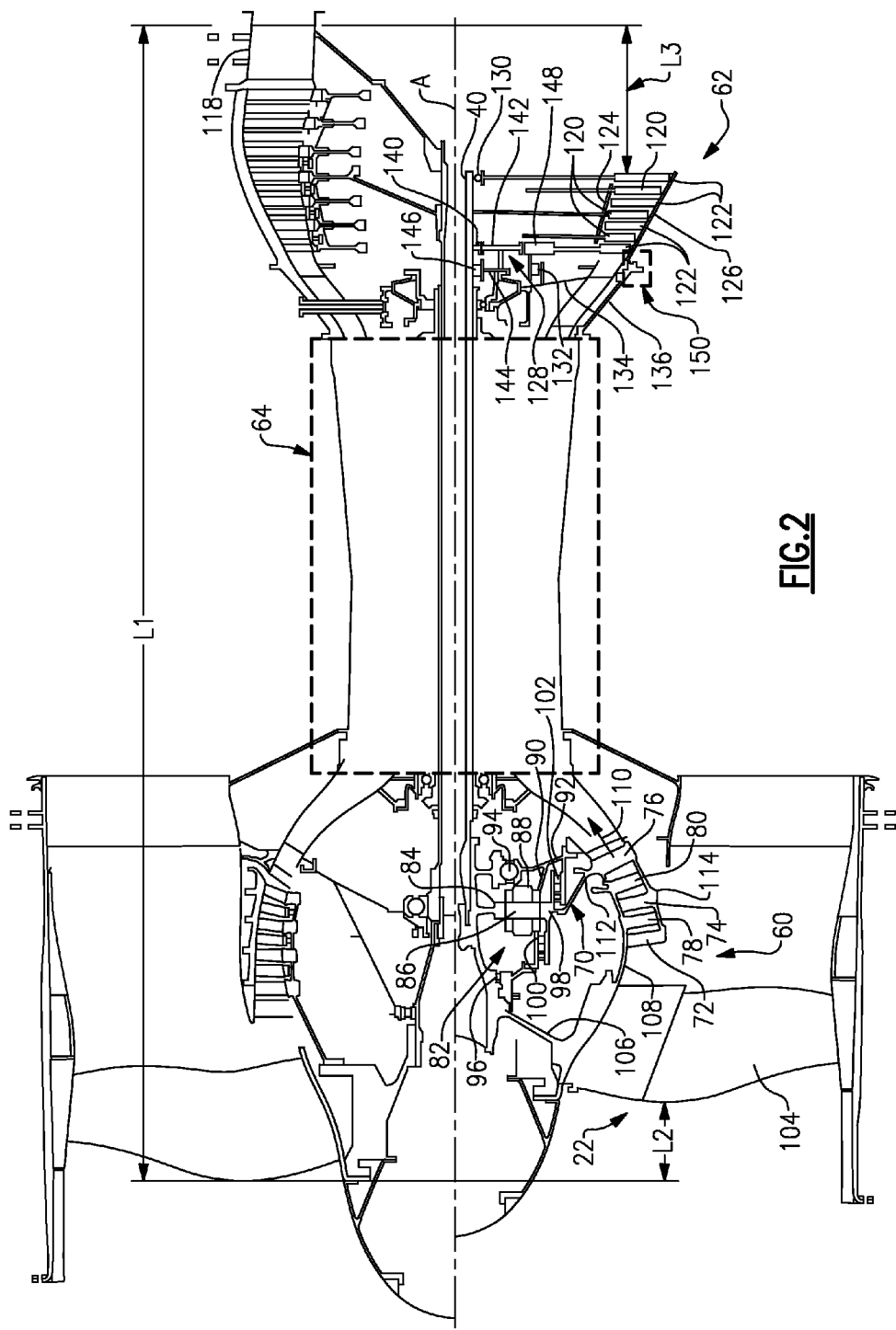
FIG. 2 is a cross-sectional view of an engine upper half showing an example of a non-counter-rotating configuration and an engine lower half showing an embodiment of a counter-rotating low pressure compressor architecture and counter-rotating low pressure turbine architecture of a gas turbine engine.
Figure 3:
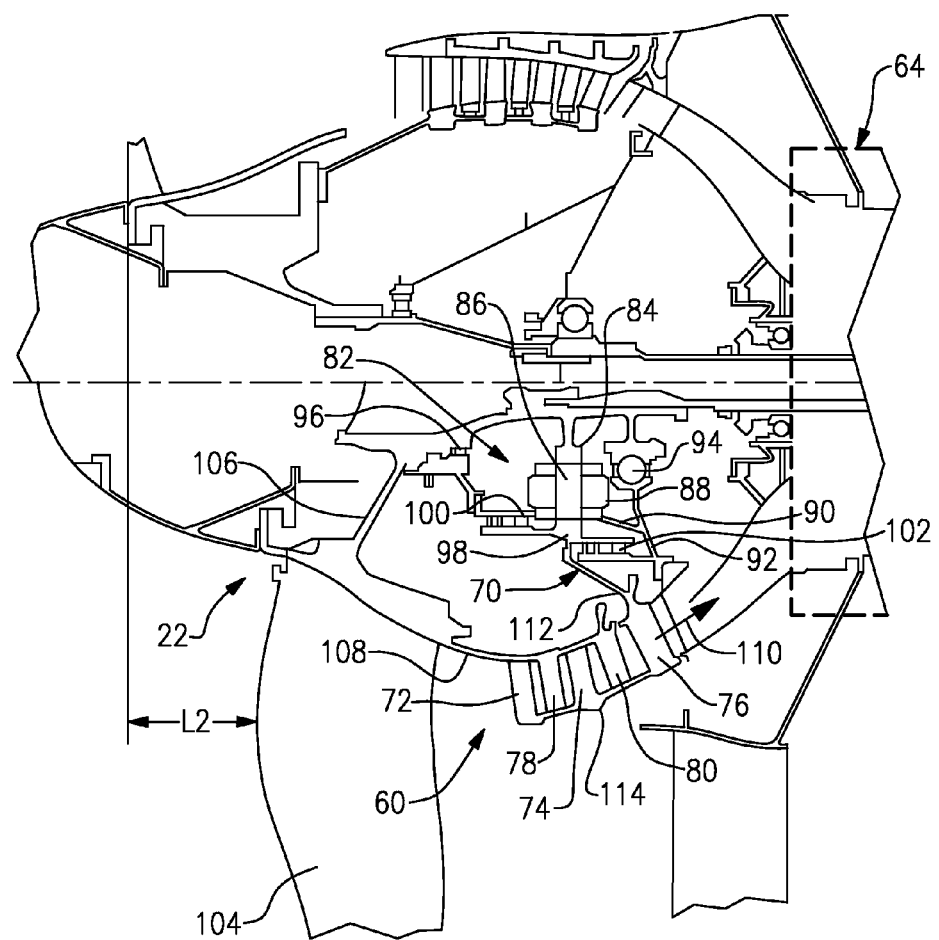
FIG. 3 shows an enlarged view of the low pressure compressor shown in FIG. 2.

Referring to FIGS. 2 and 3, a geared turbofan architecture with a counter-rotating low pressure compressor (LPC) 60 and counter-rotating low pressure turbine (LPT) 62 is provided, which significantly reduces a length of the low speed or inner shaft 40 as compared to a non-counter-rotating configuration, an example of which is shown in FIG. 1 and in the upper half of FIG. 2. This non-rotating configuration in the upper half of FIG. 2 is included for the purposes of a length comparison to the counter-rotating LPC and counter-rotating LPT configurations shown in the lower half of FIG. 2. The engine has a high pressure core, schematically indicated at 64. It is to be understood that the high pressure core 64 includes the combustor 56 and the high spool 32 (i.e., the high pressure compressor 52, the high pressure turbine 54, and the high shaft 50) shown in FIG. 1. The high pressure compressor 52 has a high pressure core ratio of 23:1, for example. To retain this ratio, as well as providing a desired low shaft diameter and speed, a combination of the counter-rotating LPC 60 and LPT 62 is utilized as shown in the lower half of FIG. 2.

One example of the LPC 60 is found in U.S. Pat. No. 7,950,220, which is assigned to the same assignee as the subject invention, and which is hereby incorporated by reference. In this example, which is shown in FIG. 2, the LPC 60 includes a counter-rotating compressor hub 70 with blade stages 72, 74, and 76 interspersed with blade stages 78 and 80 of the low speed spool 30. The counter-rotating compressor hub 70 may be driven by a transmission 82. The transmission 82 is also schematically illustrated in FIG. 5. In one example, the transmission 82 is an epicyclic transmission having a sun gear 84 mounted to the low shaft 40. A circumferential array of externally-toothed star gears 86 are in meshing engagement with the sun gear 84. The star gears 86 are carried on journals 88 carried by a carrier 90. The carrier 90 is fixedly mounted relative to an engine static structure 92. The static structure 92 is coupled to the low shaft 40 via multiple bearing systems 94 and 96 to permit rotation of the low shaft 40.

The transmission 82 further includes an internally-toothed ring gear 98 encircling and in meshing engagement with the star gears 86. The ring gear 98 is supported relative to the static structure 92 by one or more bearing systems 100 and 102. The transmission 82 causes a counter-rotation of ring gear 98. As the compressor hub 70 is engaged with the ring gear 98, the transmission 82 causes a counter-rotation of the compressor hub 70 (and blades 72, 74, 76) relative to the low speed spool 30. Fan blades 104 of the fan section 22 are mounted via a hub 106 to the low shaft 40. In addition, and low pressure compressor blades 78, 80 are also mounted to the hub 106 via a blade platform ring 108. As a result of the foregoing, the fan blades 104 and the low pressure compressor blades 78, 80 co-rotate with the low shaft 40.

An outboard surface of the platform ring 108 locally forms an inboard boundary of a core flowpath 110. The blades of stages 78 and 80 extend from inboard ends fixed to the platform ring 108 to free outboard tips. In the example shown, the blades of the downstreammost stage 76 of the hub 70 are mounted to an outboard end of a support 112. The outboard ends of the blades of the stage 76 are secured relative to a shroud ring 114. An inboard surface of the shroud ring 114 forms a local outboard boundary of the core flowpath 110. The outboard ends of the blades of the stages 72 and 74 are mounted to the shroud ring 114. The support 112 is affixed to the ring gear 98 to drive rotation of the blades of stage 76 and, through the shroud ring 114, the blades of stages 72 and 74.

As shown in the upper half of FIG. 2, in one typical non-counter-rotating configuration, the engine 20 without a counter-rotating compressor or turbine has an overall length L1 defined from a foremost surface of the fan blade 104 to an aftmost end of a turbine exhaust case 118. The LPC configuration 60 provides a length reduction L2 by utilizing a counter-rotating compressor architecture. The LPT configuration 62 provides another length reduction L3 by utilizing a counter-rotating turbine architecture. One example of a LPT is found in United States Publication No. 2009/0191045 A1, which is assigned to the same assignee as the subject invention, and which is hereby incorporated by reference.

Figure 4:
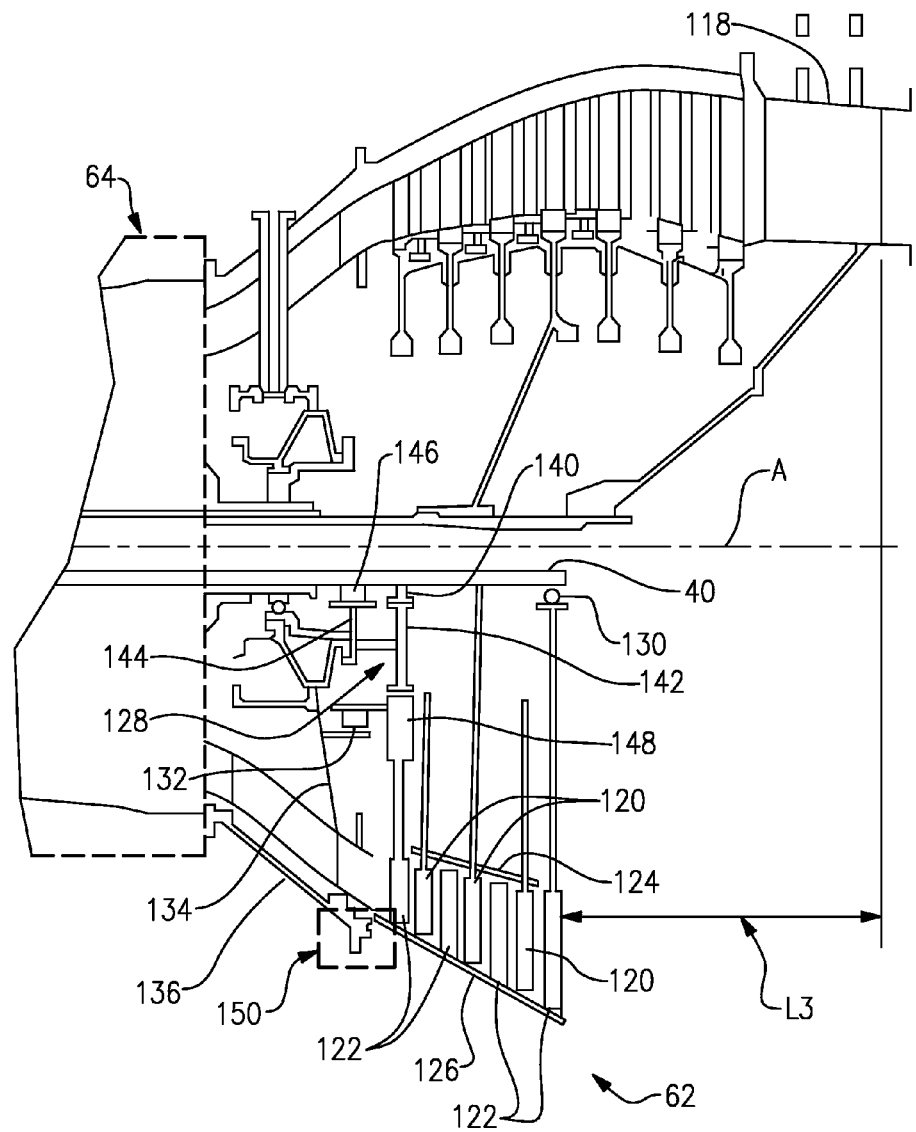
FIG. 4 shows an enlarged view of the low pressure turbine shown in FIG. 2.

FIGS. 2 and 4 show another example of a LPT 62 having a configuration that allows for the elimination of the turbine exhaust case 118, which significantly contributes the overall amount of length reduction L3. In this example, the LPT 62 has an inner set of blades 120 that are directly coupled to the low shaft 40 and an outer set of blades 122 interspersed with the inner set of blades 120. The outer set of blades 122 rotates in an opposite direction about the axis of rotation from the inner set of blades 120.

The inner set of blades 120 are fixed to an inner rotor 124 that directly drives the low shaft 40, i.e. the low shaft 40 and inner set of blades rotate at a common speed. The outer set of blades 122 are fixed to an outer rotor 126 that drives a gear system 128. Bearings 130, 132 rotatably support the outer rotor 126. Bearing 130 supports an aft end of the rotor 126 for rotation relative to the low shaft 40, while bearing 132 supports a fore end of the rotor 126 for rotation relative to a mid-turbine frame 134. Mid-turbine frame 134 comprises a static structure that extends to an outer case portion 136. In one example, the aft bearing 130 is a ball bearing and the fore bearing 132 is a roller bearing.

As shown in FIG. 6, the gear system 128 includes a sun gear 140 that is fixed to the low shaft 40. A circumferential array of externally-toothed star gears 142 are in meshing engagement with the sun gear 140. The star gears 142 are supported by a carrier 144 (FIG. 4) that is fixed to the mid-turbine frame 134. A bearing 146 supports the low shaft 40 for rotation relative to the carrier 144. In one example, the bearing 146 is a roller bearing. A ring gear 148 surrounds, and is in meshing engagement with, the star gears 142. The inner rotor 124 is coupled to the low shaft 40. The fore end of the rotor 126 drives the ring gear 148. In one example, the gear system has a ratio within a range of between about 0.5:1 to about 5.0:1.

In one example, the shaft bearing 146 and the fore bearing 132 for the outer rotor 126 are radially aligned within each other in a direction extending radially away from the axis A. The shaft bearing 146 is radially inward for the fore bearing 132.

This configuration also includes an air seal 150 at a location between the rotating and non-rotating structures. Specifically, the air seal 150 provides a sealing interface between the rotor 126 and the outer case portion 136 of the mid-turbine frame 134.

In one configuration, the gear system 128 is upstream of the LPT 62. Specifically, the gear system 128 may be positioned forward of the interspersed blades 120, 122. In another configuration, as shown in FIGS. 2 and 4, the gear system 128 may be axially aligned with the foremost outer rotor blade 122 but upstream of the inner rotor blades 120. Due to being located at this position, and because the gear system 128 is attached to the mid-turbine frame 134, the turbine exhaust case 118 (shown in the upper half of FIG. 2) can be eliminated from the engine. This results in a significant weight reduction as well as providing the desired length reduction L3.

The low shaft 40 receives a portion of the overall driving input directly from the inner set of blades 120 and a remaining portion of the overall driving input is provided by the outer set of blades 122 via the gear system 128. The outer set of blades 122 is configured to rotate at a lower speed and in an opposite direction from the inner set of blades 120. Spinning the inner set of blades 120 at a higher speed takes advantage of the existing turbine disks' ability to handle higher speeds. This configuration provides a geared turbofan architecture with a long, slow turning low shaft 40, which enables the use of a high pressure ratio core. Further, this configuration provides for significant length reduction as compared to prior configurations.

It should be understood that the LPC 60 described above is just one example configuration, and that the LPT 62 described above could be utilized with various other LPC configurations. Further, the LPT 62 could also be used in a configuration that does not include a counter-rotating LPC.

As a result of the foregoing improvements, an engine has been invented that includes both a desirable high pressure core ratio, while at the same time reducing the overall engine length, thereby maximizing the engine's power density.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a shaft defining an axis of rotation;
   a combustor section upstream of a turbine section and downstream of a compressor section,
   the turbine section comprising:
      an inner rotor directly driving the shaft, the inner rotor including an inner set of blades; and
      an outer rotor having an outer set of blades interspersed with the inner set of blades, the outer rotor configured to rotate in an opposite direction about the axis of rotation from the inner rotor;
      a gear system mounted to a mid-turbine frame structure and engaged to the outer rotor wherein the gear system is positioned upstream of the inner set of blades and downstream of the combustor section;
      wherein the gear system includes a ring gear engaged to the outer rotor, a plurality of star gears in meshing engagement with the ring gear, and a sun gear in meshing engagement with the star gears, and wherein the star gears are supported within a carrier that is mounted to the mid-turbine frame structure; and
      a first bearing positioned between the shaft and the carrier to support the shaft for rotation relative to the carrier and mid-turbine frame structure.

2. The gas turbine engine according to claim 1, wherein the sun gear is fixed for rotation with the shaft about the axis of rotation.

3. The gas turbine engine according to claim 1, wherein the first bearing is positioned upstream of the inner and outer sets of blades.

4. The gas turbine engine according to claim 1, including a second bearing supporting a fore end of the outer rotor for rotation relative to the mid-turbine frame structure and a third bearing supporting an aft end of the outer rotor for rotation relative to the shaft.

5. The gas turbine engine according to claim 4, wherein the first and second bearings are generally radially aligned with each other in an overlapping relationship.

6. The gas turbine engine according to claim 4, wherein the first bearing is positioned upstream of the inner and outer sets of blades and is between the shaft and the carrier in a radial direction.

7. The gas turbine engine according to claim 6, wherein the second bearing is between the outer rotor and the mid-turbine frame.

8. The gas turbine engine according to claim 1, including a seal located at an interface between the mid-turbine frame structure and the outer rotor.

9. The gas turbine engine according to claim 1, wherein the outer rotor comprises an aftmost end of the engine.

10. The gas turbine engine according to claim 1, wherein a fore end of the shaft is associated with a counter-rotating low pressure compressor, and wherein the gear system comprises a first gear system and including a second gear system associated with the counter-rotating low pressure compressor that is independent of the first gear system.

11. The gas turbine engine according to claim 1, including a seal between the mid-turbine frame structure and the outer rotor.

12. A gas turbine engine comprising:
a core air flowpath;
a shaft supporting a compressor section and a turbine section arranged within the core flowpath;
a combustor section upstream of the turbine section and downstream of the compressor section; and
wherein the turbine section includes a counter-rotating low pressure turbine comprising:
an inner rotor directly driving the shaft, the inner rotor including an inner set of blades,
an outer rotor having an outer set of blades interspersed with the inner set of blades, the outer rotor configured to rotate in an opposite direction about the axis of rotation from the inner rotor,
a gear system mounted to a mid-turbine frame structure and engaged to the outer rotor wherein the gear system is positioned upstream of the inner set of blades and downstream of the combustor section,
wherein the gear system includes a ring gear engaged to the outer rotor, a plurality of star gears in meshing engagement with the ring gear, and a sun gear in meshing engagement with the star gears, and wherein the star gears are supported within a carrier that is mounted to the mid-turbine frame structure and
a first bearing positioned between the shaft and the carrier to support the shaft for rotation relative to the carrier and mid-turbine frame structure.

13. The gas turbine engine according to claim 12, wherein the compressor section includes a high pressure compression section that has a pressure ratio of approximately 23:1.

14. The gas turbine engine according to claim 12, wherein the compressor section includes a counter-rotating low pressure compressor driven by the shaft, wherein the gear system comprises a first gear system and including a second gear system associated with the counter-rotating low pressure compressor that is independent of the first gear system.

15. The gas turbine engine according to claim 12, including a second bearing supporting a fore end of the outer rotor for rotation relative to the mid-turbine frame structure and a third bearing supporting an aft end of the outer rotor for rotation relative to the shaft, and wherein the first and second bearings are upstream of the inner and outer sets of blades.

16. The gas turbine engine according to claim 15, wherein the first and second bearings are generally radially aligned with each other in an overlapping relationship.

17. The gas turbine engine according to claim 15, wherein the first and second bearings are roller bearings and the third bearing is a ball bearing.

18. The gas turbine engine according to claim 15, wherein the first bearing is between the shaft and the carrier in a radial direction.

19. The gas turbine engine according to claim 18, wherein the second bearing is between the outer rotor and the mid-turbine frame.

20. The gas turbine engine according to claim 12, including a seal located between the mid-turbine frame structure and the outer rotor.

21. The gas turbine engine according to claim 12, wherein the sun gear is fixed for rotation with the shaft about the axis of rotation.

22. The gas turbine engine according to claim 12, including a seal between the mid-turbine frame structure and the outer rotor.

* * * * *